(12) United States Patent
Botrugno

(10) Patent No.: US 11,230,035 B2
(45) Date of Patent: Jan. 25, 2022

(54) MOLD MANUFACTURING METHOD AND MOLD

(71) Applicant: GREGARIO S.R.L., Caraglio (IT)

(72) Inventor: Salvatore Botrugno, Caraglio (IT)

(73) Assignee: Gregario S.R.L., Caraglio (IT)

( * ) Notice: Subject to any disclaimer, the term of this patent is extended or adjusted under 35 U.S.C. 154(b) by 111 days.

(21) Appl. No.: 16/756,761

(22) PCT Filed: Oct. 10, 2018

(86) PCT No.: PCT/IB2018/057832
§ 371 (c)(1),
(2) Date: Apr. 16, 2020

(87) PCT Pub. No.: WO2019/077441
PCT Pub. Date: Apr. 25, 2019

(65) Prior Publication Data
US 2020/0331170 A1      Oct. 22, 2020

(30) Foreign Application Priority Data
Oct. 17, 2017   (IT) .......................... 102017000116676

(51) Int. Cl.
*B29C 33/38*  (2006.01)
*B33Y 80/00*  (2015.01)
*B62K 19/16*  (2006.01)

(52) U.S. Cl.
CPC .......... *B29C 33/3842* (2013.01); *B33Y 80/00* (2014.12); *B62K 19/16* (2013.01)

(58) Field of Classification Search
CPC .. B29C 33/306; B29C 33/308; B29C 33/3842
See application file for complete search history.

(56) References Cited

U.S. PATENT DOCUMENTS

| 5,876,054 A * | 3/1999 | Olson ................... B62K 19/16 |
| | | 280/281.1 |
| 2003/0094067 A1 | 5/2003 | Whiting et al. |
| 2008/0054592 A1* | 3/2008 | Vroomen ............... B62K 19/16 |
| | | 280/281.1 |

FOREIGN PATENT DOCUMENTS

WO         03089291 A1      10/2003

OTHER PUBLICATIONS

International Search Report, issued in PCT/IB2018/057832, dated Dec. 19, 2018, Rijswijk, Netherlands.
(Continued)

*Primary Examiner* — James Sanders
(74) *Attorney, Agent, or Firm* — Thomas|Horstemeyer LLP

(57) ABSTRACT

A mold manufacturing method for monocoque bicycle components comprises the steps of i) providing a first female mold comprising a pair of first half molds delimiting first surfaces to circumscribe a first mold cavity to form first component portions; ii) providing a second female mold comprising a pair of second half molds delimiting second surfaces to circumscribe a second mold cavity to form second component portions; and iii) interposing at least part of third female molds between the first and second female molds, so that third surfaces delimited by the third female molds join with continuity the first and the second surfaces, the third surfaces being configured to form third component portions in a single piece with the first and second component portions. Step iii) comprises a sub-step of manufacturing at least part of the third surfaces of the third female molds by rapid prototyping.

11 Claims, 2 Drawing Sheets

(56) References Cited

OTHER PUBLICATIONS

Red Bulli Bike, "Carbon Fiber Bike Built With 3D Printer—Fettlers—Chapter 2", YouTube, Feb. 12, 2015, pp. 1-2, Retrieved from the Internet: URL:https://www.youtube.com/watch?v=5gFyqFGtqsM, (retrieved on Jul. 3, 2018), XP054978480.

Unknown, "Carbon Wasp Ltd on Twitter: "@SteveOttosen PS No plans for a fat bike but never say never. Maybe as a custom job for someone else."", Apr. 19, 2015, Retrieved from the Internet: URL:https://twitter.com/carbonwasp/status/591137769273044992, (retrieved on Jul. 3, 2018), XP055489763.

Tyler Benedict, "PBE14: Calfee Starts 3D Printing Carbon Fiber Molds, Gears Up for E-Bikes—Bikerumor", Nov. 2014, Retrieved from the Internet: URL:https://bikerumor.com/2014/11/08/pbe14-calfee-starts-3d-printing-carbon-fiber-molds-gears-up-for-e-bikes/ (retrieved on Jul. 3, 2018), XP055489811.

\* cited by examiner

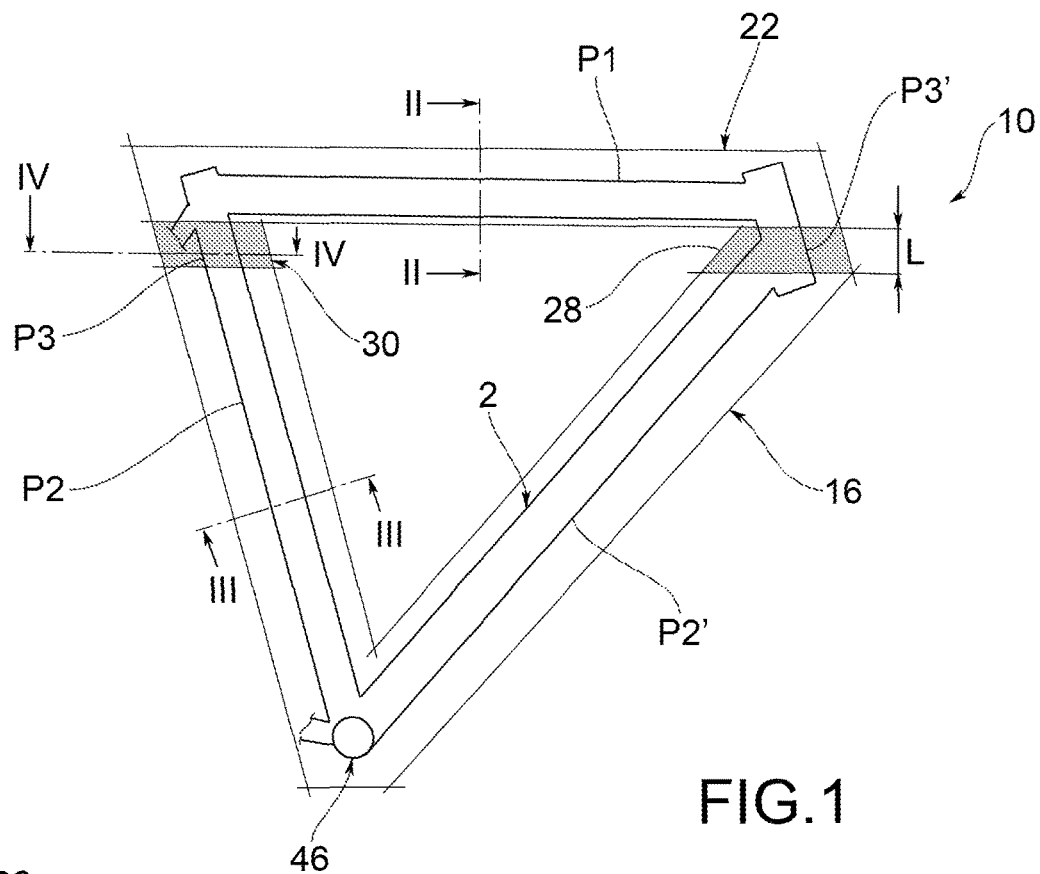
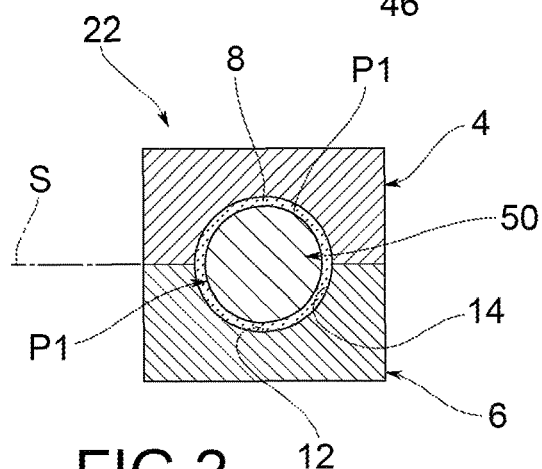
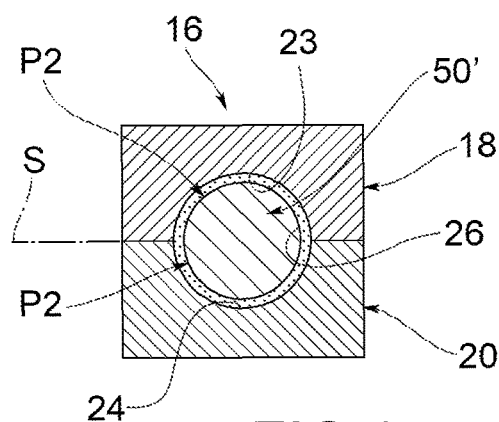
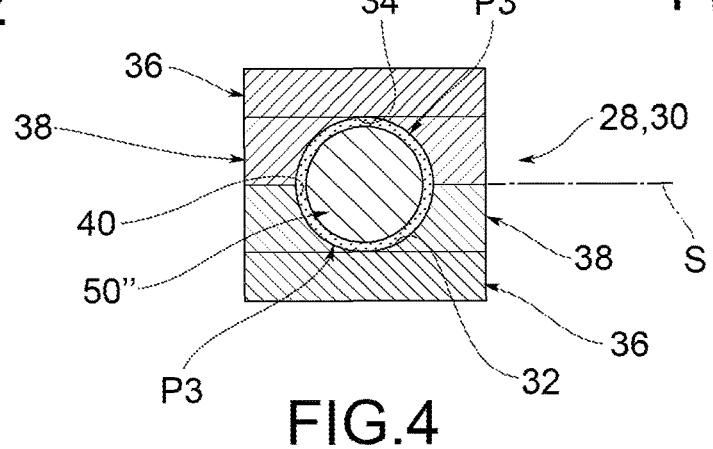
FIG.1
FIG.2
FIG.3
FIG.4

MOLD MANUFACTURING METHOD AND MOLD

CROSS-REFERENCE TO RELATED APPLICATIONS

This application is a National Phase filing of PCT International Application No. PCT/IB2018/057832, having an International Filing Date of Oct. 10, 2018, claiming priority to Italian Patent Application No. 102017000116676, having a filing date of Oct. 17, 2017 each of which is hereby incorporated by reference in its entirety.

FILED OF THE INVENTION

The present invention concerns a method for the manufacture of molds for monocoque bicycle components, and a mold for the manufacture of monocoque bicycle components made, for example, by such method.

BACKGROUND OF THE INVENTION

The prior document WO 03/089291 A1 illustrates a system of molds for the production of custom-made bicycle frames, where such frames are initially made of two separate molds, which in a later stage must be mounted to each other by mechanical attachment means.

In such known system, each mold consists of mold modules that may be assembled in various ways to obtain a finite number of desired frame geometries.

The solution taught in document WO 03/089291 A1, although satisfactory in some respects, does not resolve the problem of obtaining a custom frame in a single piece (so-called monocoque frame), e.g. from a mold.

Moreover, according to the present system, it is not necessary to manage all possible dimensional variables—e.g. frame length and/or height—as in the prior art, inasmuch as such circumstance would make the system excessively expensive due to the large number of mold modules required.

The present invention is part of the preceding context and aims to provide a manufacturing method that assumes to provide at least one pair of standard molds, mutually joined together through special molds, shaped or molded to measure, preferably at low cost.

In this way, the proposed method, in addition to severely limiting the overall investment for manufacturing the molds, allows the scope of applicability of the monocoque components production to be extended beyond the mere bicycle frame.

SUMMARY OF THE INVENTION

Such object is achieved the method and the mold having the features described below. Preferred embodiments are also described.

BRIEF DESCRIPTION OF THE DRAWINGS

The object of the present invention will now be described in detail, with the aid of the accompanying figures, wherein:

FIGS. 1, 5, 6 show schematic views in plan of molds, object of the present invention, according to possible embodiments;

FIGS. 2, 3, 4 illustrate cross-sections along the planes II-II, IV-IV shown in FIG. 1.

DETAILED DESCRIPTION

The aforesaid objective is achieved through a mold manufacturing method 10, 10' for monocoque bicycle components 2, 2'.

In accordance with one embodiment, the monocoque of the monocoque bicycle component 2, 2' is made of a composite material (e.g. a composite polymeric material) containing reinforcing fibers, such as carbon fibers, glass fibers, basalt fibers, polymeric fibers or combinations thereof.

Figure 5:
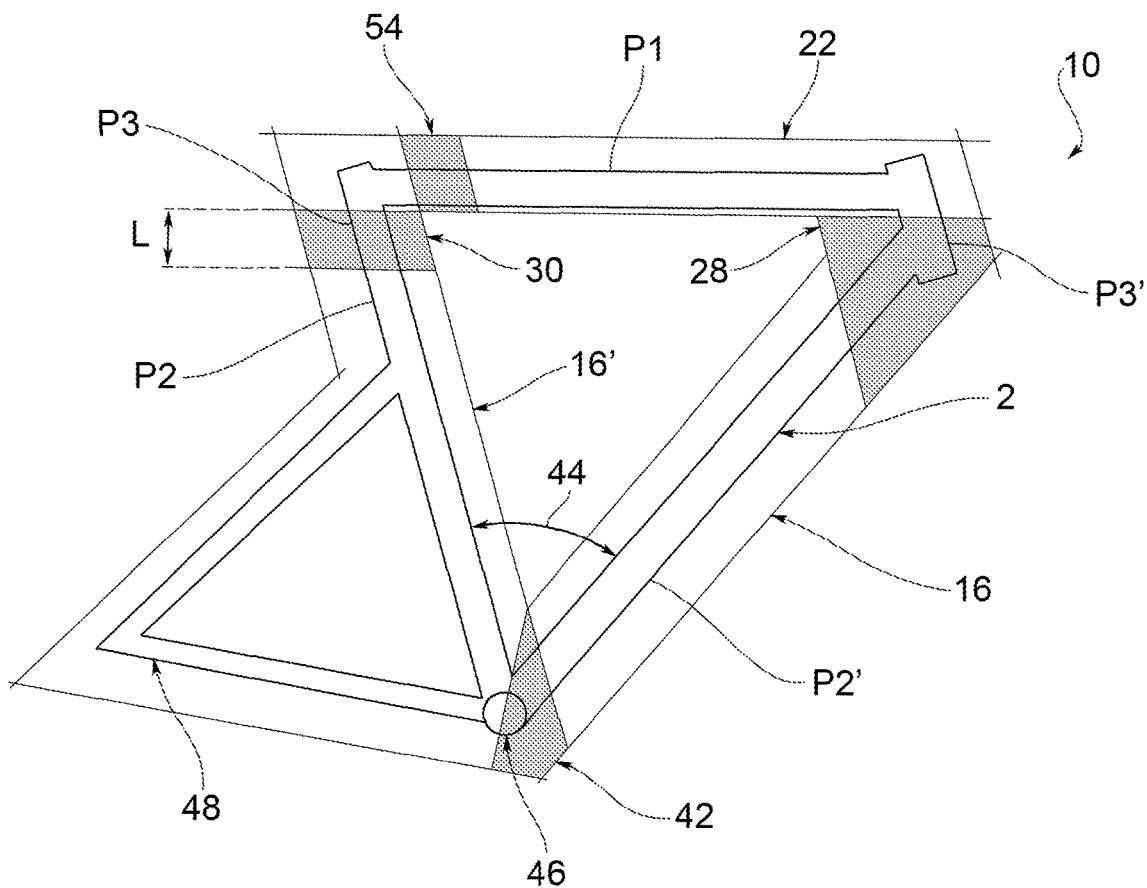

In accordance with one embodiment, the monocoque component is a monocoque handlebar 2' (for example see FIG. 6), a monocoque frame 2 (FIG. 5), a main monocoque diamond (or main triangle; FIG. 1) or at least a rear monocoque triangle 48 of a bicycle.

Such method comprises the steps of:
i) providing a first female mold 22 (e.g. standardized), comprising a pair of first half-molds 4, 6 delimiting first surfaces 8, 12 for circumscribing a first mold cavity 14 to form first component portions P1;
ii) providing a second female mold 16, 16' (e.g. standardized) comprising a pair of second half-molds 18, 20 delimiting second surfaces 23, 24 for circumscribing a second mold cavity 26 to form second component portions P2, P2';
iii) interposing at least part of at least a third female mold 28, 30 (e.g. customized) between the first 22 and the second 16, 16' female mold, so that third surfaces 32, 34 delimited by such third mold 28, 30 join—advantageously with substantial continuity—the first 8, 12 and the second 23, 24 surfaces.

It should be noted that in the accompanying figures the third female molds, or in any case all the advantageously customizable female molds, are shown with a partially shaded surface.

According to one embodiment, the first component portion P1 and/or at least a second component portion P2, P2' comprises or consists of a substantially tubular body.

Figure 6:
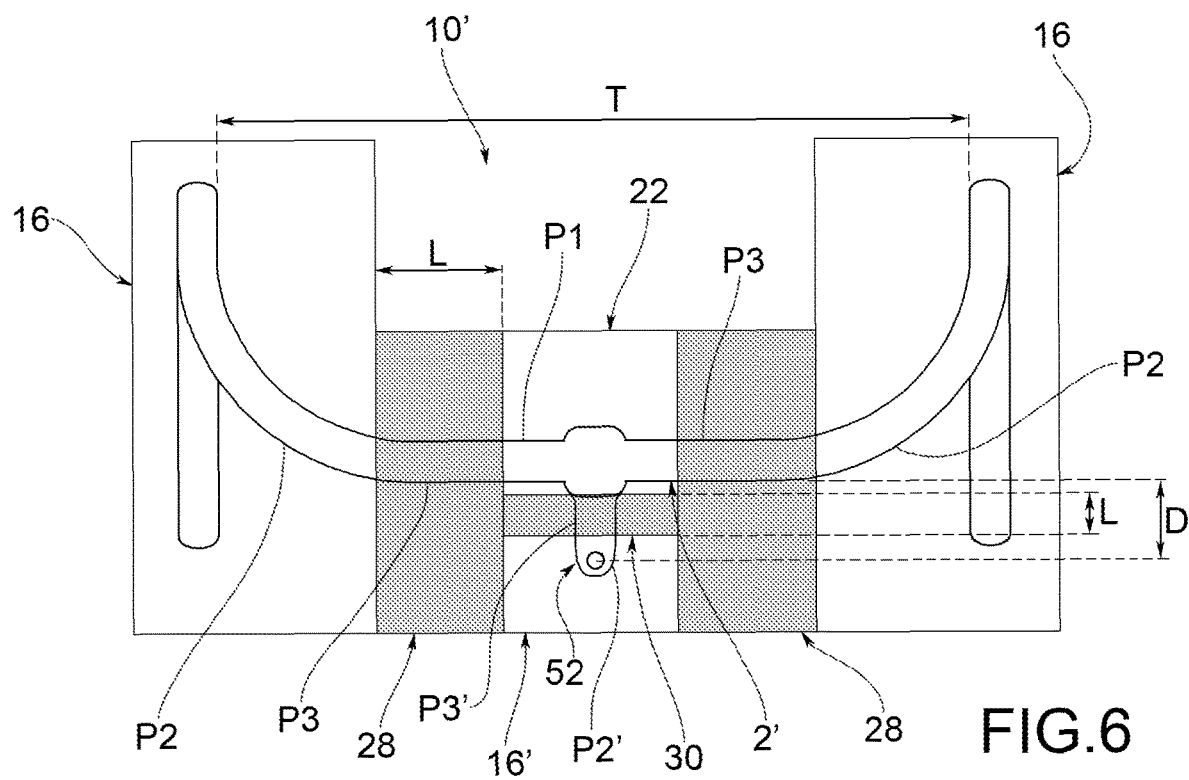

By way of example, such at least one substantially tubular body could be substantially rectilinear (e.g. see the portion P1 in FIG. 1) or curved (e.g. see the portion P2 in FIG. 6).

In accordance with one embodiment, step iii) comprises a step of interposing at least part of third female molds 28, 30 (for example a pair thereof) between the first 22 and the second 16, 16' female mold.

According to one embodiment, in one or more female molds 22, 16, 16', 28, 30 at least one male mold 50, 50', 50" and/or an expandable bladder are at least partially inserted to obtain internally hollow monocoque components.

In accordance with one embodiment, around one or more male molds 50, 50', 50" and/or around one or more expandable bladders are wrapped in layers of reinforcement fibers impregnated with binder resin so that, after the mold and/or the bladder with such impregnated layers is inserted into the female molds, the resin hardens after the molds are placed in a furnace.

Once hardened, the mold and/or bladder, or the plurality thereof, is extracted from the inner cavity of the monocoque component.

The third surfaces 32, 34 are configured to form third component portions P3, P3' in one piece with the first P1 and with the second P2 component portions.

More precisely, the third component portions P3, P3' are molded substantially in the same molding operation and substantially at the same time that the first P1 and the second P2 component portions are molded.

In other words, the third surfaces 32, 34 are not used to join component lengths (e.g. tubular bodies) by over-molding bonding material between such lengths, but rather are configured to create the entire component in a single piece (for example a casting piece or a cross-linking/hardening piece).

In accordance with one embodiment, the third surfaces 32, 34 of the third female molds 28, 30 are customized at least in their own length L and/or in their orientation in a mold plane S so as to adjust a relative distance and/or relative positioning (in particular, customized, to measure) between the first 22 and the second 16, 16' female mold.

In accordance with one embodiment, the orientation in the mold plane S could occur through a modification of the relative angle between rectilinear portions, and/or through the use of curvilinear portions.

In accordance with one embodiment, the third surfaces 32, 34 are flanked in a replaceable way between the first 8, 12 and the second 23, 24 surfaces.

According to the invention, step iii) comprises at least a sub-step of manufacturing at least one part of the third surfaces 32, 34 of the third female molds 28, 30 by means of rapid prototyping.

It should be noted that, within this description, the expression "rapid prototyping" means one or more manufacturing techniques aimed at the creation of a physical prototype (specifically: in relatively brief but variable times, depending on the size of the surfaces to be made) starting from a three-dimensional mathematical definition of the object (for example, processed with CAD (computer-aided drafting) systems), the object being—specifically—at least one part of the third surfaces 32, 34 (e.g. all of the third surfaces).

In accordance with one embodiment, step iii) comprises at least one sub-step of manufacturing at least one part of the third surfaces 32, 34 through additive manufacturing.

In accordance with one embodiment (in this regard see, for example, FIG. 4), at least a third female mold 28, 30 comprises a support portion 36 and a molding portion 38 (e.g. customized) that delimits the third surface 32, 34.

In accordance with one embodiment, the molding portion 38 is removably connected to the support portion 36.

In accordance with one embodiment, only the molding portion 38 is made by rapid prototyping, for example by placing a plurality of subsequent construction layers on the support portion 36.

In accordance with one embodiment, the third female molds 28, 30 are entirely or predominantly made by rapid prototyping.

In accordance with one embodiment, the third surfaces 32, 34 or the third female molds 28, 30 are disposable.

It should be noted that, in this description, the term "disposable" means single-use, without reuse of the aforesaid third surfaces or of the aforesaid third molds.

In accordance with one embodiment, the third surfaces 32, 34 or the third female molds 28, 30 are designed to wear out in a planned way, for example after a few production cycles (e.g. in 3 to 10 cycles) with respect to the first and second female molds, which are conversely designed to work longer (e.g. for hundreds if not thousands of cycles).

In accordance with one embodiment, the first mold cavity 14 and/or the second mold cavity 26 are complementary in shape to at least one part of a horizontal tube P1, a seat tube P2 and/or an oblique tube P2' of a monocoque frame 2.

In the embodiments shown in FIGS. 2-4, the cross-section through the aforesaid tubes P1, P2, P2' is substantially circular.

In accordance with other embodiments not illustrated, the cross-section through the aforesaid tubes could be non-circular, e.g. ovoidal, ellipsoidal or in the shape of a teardrop. Other geometries of such section are also possible.

In accordance with one embodiment, the third surfaces 32, 34 circumscribe at least a third mold cavity 40, complementary in shape to at least part of a steering tube P3' and/or a different part of the seat tube P3.

This variant corresponds to the simplest embodiment of the present method, as the distance between the first 22 and the second 16, 16' female mold is adjustable in a single dimension (specifically: in height, according to the orientation of FIG. 1), depending on the shape and/or the size of the third female mold.

In other words, referring for example to the variant of FIG. 1, a greater or smaller length L of the third female molds 28, 30 will produce a greater or smaller distance between the horizontal tube and a node portion 46 of the monocoque frame 2.

It should be noted that the node portion 46 is defined as the portion where in the central movement of the pedals (not illustrated) takes place, i.e. the portion of convergence between the seat tube P2 and the oblique tube P2'.

In accordance with one embodiment, the first mold cavity 14 and/or the second mold cavity 26 are complementary in shape to at least one part of an intermediate body P1, and/or a handle portion P2 of a monocoque handlebar 2'.

In accordance with one embodiment, the monocoque handlebar 2' comprises a pair of handle portions P2, for example, bent back.

In accordance with one embodiment, the third surfaces 32, 34 circumscribe at least one cavity of the third mold 40 complementary in shape to at least a different stem portion P3' and/or at least one intermediate portion P3 between the intermediate body P1 and the handle portion P2.

Therefore, referring for example to the embodiment of FIG. 6, the monocoque handlebar 2' may be designed in an extremely versatile way, both as regards the transverse distance T between the pair of handle portions P2 and/or as regards the longitudinal distance D between the intermediate body P1 and a coupling zone 52 of the monocoque handlebar to a non-illustrated steering tube.

In accordance with one embodiment, the first 8, 12, the second 23, 24 and the third 32, 34 surfaces are concave and jointly delimit a single mold cavity 14, 26, 40 wherein the monocoque component 10, 10' is molded.

In accordance with one embodiment, the single mold cavity 14, 26, 40 could be closed on itself in a ring.

In accordance with one embodiment, the method further comprises a step iv.a) of interposing at least a fourth female mold 42 (e.g. customized) between a pair of second female molds 16, 16', e.g. standardized, to form a node portion 46, variable in the amplitude of the angle 44 enclosed between a seat tube P2 and an oblique tube P2' of a monocoque frame 2.

In accordance with one embodiment, the method further comprises a step iv.b) of interposing at least a fourth female mold (e.g. customized) between a pair of second female molds e.g. standardized to form a portion, variable in the amplitude of the angle enclosed between an oblique tube P2' and a seat tube P2 of a monocoque frame 2.

In accordance with one embodiment, the method further comprises a step v) of flanking at least a fifth female mold 54 (e.g. customized) along a horizontal tube P1, so as to change its length longitudinally.

The aforesaid objective is also achieved by means of a mold 10, 10' for creating the monocoque bicycle components 2, 2'.

Since such mold is advantageously made using the method discussed above, even if this was not explicit, such mold could comprise all the additional or advantageous features inferable from the preceding method.

The mold 10, 10' comprises:
i) a first female mold 22 (e.g. standardized), comprising a pair of first half-molds 4, 6 delimiting first surfaces 8, 12 for circumscribing a first mold cavity 14 to form first component portions P1;
ii) a second female mold 16, 16' (e.g. standardized) comprising a pair of second half-molds 18, 20 delimiting second surfaces 23, 24 for circumscribing a second mold cavity 26 to form second component portions P2, P2';
iii) at least part of at least a third female mold 28, 30 (for example, customized) interposed between the first 22 and the second 16, 16' female mold, so that third surfaces 32, 34 delimited by such third mold 28, 30 join with substantial continuity the first 8, 12 and second 23, 24 surfaces, the third surfaces 32, 34 being configured to form third component portions P3, P3' in a single piece with the first P1 and with the second P2 component portions;
wherein at least one part of the third surfaces 32, 34 of the third female molds 28, 30 is manufactured by means of rapid prototyping, for example by means of additive manufacturing.

Innovatively, the method and the mold object of the present invention make it possible to fully achieve the objects mentioned in the introduction.

In particular, such method/mold allows molds for monocoque components to be made at low cost, as the basic idea is to be able to largely take advantage of standardized molds, for example with a tubular shape, which must be associated with special molds, customized and manufactured to obtain a great variety of geometries of the components.

Advantageously, the method/mold object of the present invention allows the pitch, width, length and/or orientation of the parts that make up the monocoque components to be increased, through the replacement of specific portions of the mold.

Advantageously, in the method/mold object of this invention, the cost of manufacturing the third and fourth/fifth female molds is extremely low, at least by comparison to the molds traditionally used.

Advantageously, in the method/mold object of the present invention, custom molds are designed to be used only a small number of times or, at the limit, only once.

Advantageously, the method/mold object of the present invention allows only a part of the custom molds to be replaced, having a common base, in order to reduce to a minimum the quantity of material necessary during the prototyping.

Advantageously, this common base may be used repeatedly with various made-to-measure molding geometries.

To the embodiments of the aforesaid method and mold, a person skilled in the art, in order to meet specific needs, may make variants or substitutions of elements with others that are functionally equivalent.

These variants are also contained within the scope of protection as described and claimed herein.

Furthermore, each variant described as belonging to a possible embodiment may be achieved independently of the other described variants.

The invention claimed is:

1. A mold manufacturing method for monocoque bicycle components comprising the steps of:
 i) providing a first female mold comprising a pair of first half molds delimiting first surfaces for circumscribing a first mold cavity to form first component portions;
 ii) providing a second female mold comprising a pair of second half molds delimiting second surfaces for circumscribing a second mold cavity to form second component portions;
 iii) interposing at least part of at least a third female mold between the first female mold and the second female mold, so that third surfaces delimited by said at least third female mold join with substantial continuity the first and second surfaces, the third surfaces being configured to form third component portions in a single piece with the first and second component portions;
 wherein step iii) comprises a sub-step of manufacturing at least a part of the third surfaces of third female molds by rapid prototyping, by one or more manufacturing techniques aimed at producing a physical prototype from a mathematical definition of at least a part of the third surfaces; and
 iv) at least one of:
  a) interposing at least one fourth female mold between a pair of second standardized female molds to form a node portion variable in width at a corner enclosed between a seat tube and an oblique tube of a monocoque bicycle frame; and
  b) interposing at least one fourth female mold between a pair of second standardized female molds to form a portion variable in amplitude of an angle enclosed between the oblique tube and the seat tube of the monocoque bicycle frame.

2. The mold manufacturing method of claim 1, wherein the third component portions are substantially formed in a same molding operation and substantially at the same time as the first and the second component portions.

3. The mold manufacturing method of claim 1, wherein the third surfaces of the third female molds are customized at least in their length and/or in their orientation in a mold plane so as to adjust a relative distance and/or relative positioning between the first female mold and the second female mold.

4. The mold manufacturing method of claim 1, wherein the third surfaces are flanked interchangeably between the first and second surfaces.

5. The mold manufacturing method of claim 1, wherein at least a third female mold comprises a support portion and a customized molding portion delimiting the third surfaces and removably connected to the support portion.

6. The mold manufacturing method of claim 1, wherein the third surfaces of the third female molds are disposable.

7. The mold manufacturing method of claim 1, wherein the first mold cavity and/or the second mold cavity are complementary in shape to at least a portion of a horizontal tube, a seat tube and/or an oblique tube of a monocoque frame, and wherein the third surfaces circumscribe at least a third mold cavity complementary to at least part of a steering tube and/or a different part of the seat tube.

8. The mold manufacturing method of claim 1, wherein the first mold cavity and/or the second mold cavity are complementary in shape to at least a portion of an intermediate body and/or a handle portion of a monocoque handlebar, and wherein the third surfaces circumscribe at least a third mold cavity complementary to at least one different stem portion and/or at least one intermediate portion between the intermediate body and the handle portion.

9. The mold manufacturing method of claim 1, wherein the monocoque bicycle component is a monocoque handlebar, a monocoque frame, a main monocoque diamond, or at least a rear monocoque triangle of a bicycle.

10. The mold manufacturing method of claim 1, wherein the monocoque of the monocoque bicycle component is made of a composite polymeric material containing reinforcing fibers selected from carbon fibers, glass fibers, basalt fibers, polymeric fibers, and combinations thereof.

11. The mold manufacturing method of claim 1, wherein at least a part of the third surfaces of the third female molds is manufactured through additive manufacturing.

\* \* \* \* \*